May 8, 1923.
C. A. ZAHN
1,454,098
VEHICLE CURTAIN
Filed Aug. 26, 1920
2 Sheets-Sheet 1
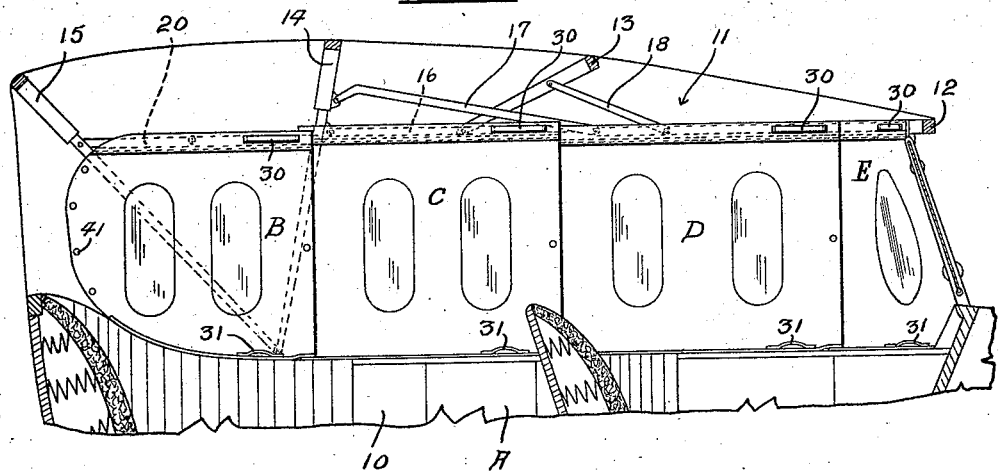
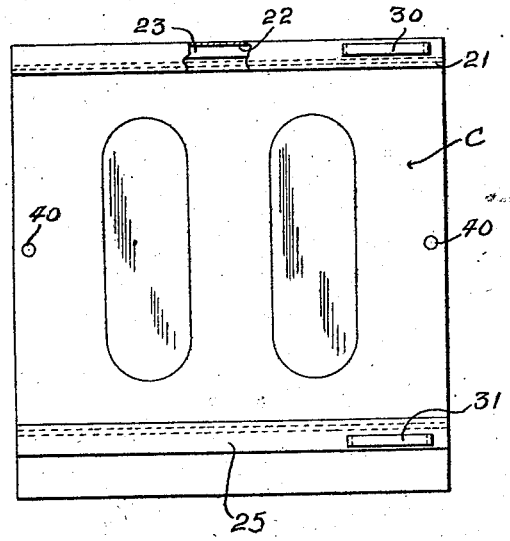
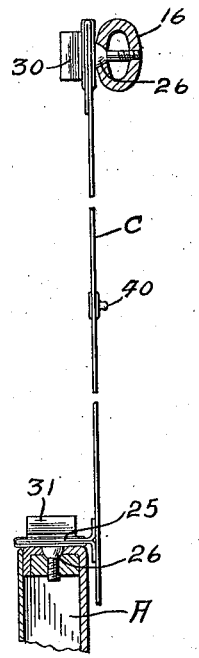
Inventor
Charles A. Zahn
Attorneys May 8, 1923.
C. A. ZAHN
1,454,098
VEHICLE CURTAIN
Filed Aug. 26, 1920
2 Sheets-Sheet 2
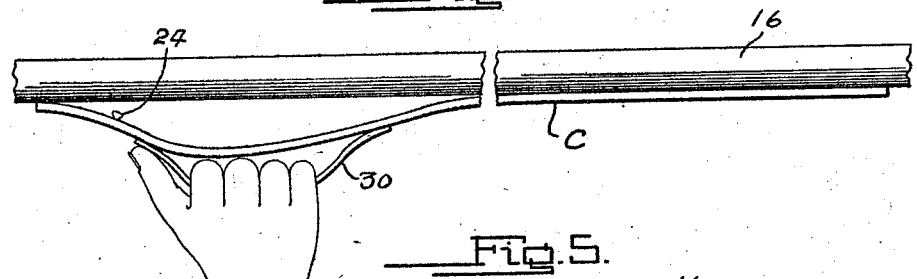
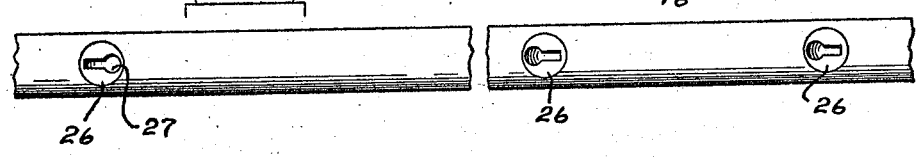
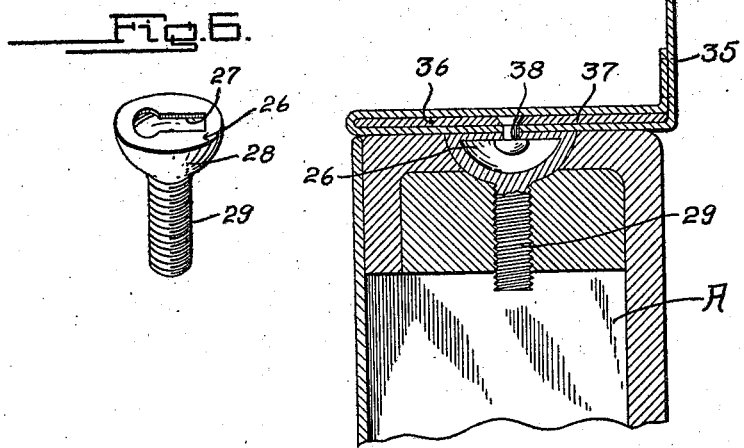
Inventor
Charles A. Zahn.
By Lancaster and Allwine
Attorney Patented May 8, 1923.

1,454,098

UNITED STATES PATENT OFFICE.

CHARLES A. ZAHN, OF MERRILL, WISCONSIN.

VEHICLE CURTAIN.

Application filed August 26, 1920. Serial No. 406,110.

*To all whom it may concern:*

Be it known that I, CHARLES A. ZAHN, a citizen of the United States, residing at Merrill, in the county of Lincoln and State of Wisconsin, have invented certain new and useful Improvements in Vehicle Curtains, of which the following is a specification.

This invention relates to curtains for motor vehicles and the primary object of the invention is to provide an improved means for constructing vehicle curtains and an improved means for attaching the same to a vehicle so that the curtains can be quickly and easily secured to the vehicle from the inside thereof.

A further object of the invention is to provide an improved means for making and attaching curtains to vehicles in which the fasteners utilized are countersunk within the vehicle body, so that the same cannot be seen from the outside of the vehicle and detract from the appearance thereof.

A still further object of the invention is to provide an improved means for attaching and making vehicle curtains, the curtains embodying resilient atttaching rods carried by the terminals thereof, the attaching rods having means for engaging cooperating attaching means carried by the vehicle body and top.

With these and other objects in view, the invention consists in the novel construction, arrangement and formation of parts as will be hereinafter more specifically described, claimed and illustrated in the accompanying drawings, forming a part of this specification; in which drawings:

Figure 1 is a fragmentary vertical longitudinal section through a vehicle body illustrating the improved curtain attached thereto.

Figure 2 is an elevation of one of the improved curtains.

Figure 3 is a fragmentary vertical transverse section through a vehicle showing the method of attaching the improved curtain thereto.

Figure 4 is a fragmentary plan view of a part of a vehicle top showing the method of attaching the curtain thereto.

Figure 5 is a side elevation of a portion of the vehicle top, showing parts of the fasteners embedded therein.

Figure 6 is a detail perspective view of one of the fasteners which are embedded in the vehicle body and top, and Figure 7 is an enlarged fragmentary vertical transverse section through a portion of the vehicle body and curtain showing the means of connecting the curtain to the body.

Referring to the drawings in detail, wherein similar reference characters designate corresponding parts throughout the several views, the letter A indicates a motor vehicle and B, C, D, and E the improved curtains therefor.

The vehicle A may be of any preferred construction or make and includes the usual body 10 and the top 11.

The top 11 includes the front forward bow 12, the relatively short intermediate bow 13, the relatively long intermediate bow 14 and the rear bow 15. The forward bow 12 is connected in the usual manner to the side arms 16 which are in turn pivotally connected to the relatively large intermediate bow 14. The intermediate bows 13 and 14 are also connected in the usual manner by means of the links 17 and 18 with the forward bow 12 in the usual manner. The rear intermediate bow 14 and the rear bow 15 are connected by means of the pivoted links 20.

The improved curtains B, C, D and E are constructed of any preferred material and are cut to conform to the configuration of the body and top at the part at which they are to fit. While four curtains have been shown, it is to be understood that more or less curtains or sections can be utilized if so desired.

Each curtain ʟ, C, D and E is constructed substantially the same and the description of one will suffice as a description of all. The upper edges of the curtain are turned over and affixed to the main body portion by rows of stitching 21 so as to form a pocket 22 for the resilient metallic rod 23. The rod 23 is formed substantially flat and may be constructed similar to the ordinary stays now utilized in corsets. This rod 23 has connected thereto at spaced points the headed studs 24 which form means for connecting the curtains to the vehicle top as will be hereinafter more specifically described.

Each of the curtains adjacent to their lower free edge have stitched or otherwise secured thereto a pocket 25 in which is mounted a flexible metallic rod carrying studs similar to the studs 24. The studs 24 carried by the upper and lower ends of the curtains form the male portions of fasteners and the female portions thereof are carried by the arms of the forward bow 12, the side arms 16 and the links 20. The female fasteners are designated by the numeral 26 and it is preferred that these fasteners be arranged in spaced relation to each other and are so shaped as to conform to the distance between the male portions of the fasteners or headed studs 24. As shown a pair of the female fasteners 26 are located adjacent to one end of the bows, arms or links, where a curtain is to be secured and another female member located adjacent to the other end. These female members are provided with oppositely directed keyhole slots 27 formed in the enlarged heads 28 thereof. These heads are formed hollow, so that the studs can readily fit in the same. The heads are provided with the depending shanks 29 which are fitted in the upper edge of the body A of the vehicle or the forward bow, connecting arms or links as the case may be. The heads are preferably counter-sunk so as to lie flush with the parts they are associated with. Flexible handles 30 and 31 are secured to the curtains adjacent to the upper and lower edges thereof and are so positioned as to be adjacent to the single fastener.

When the curtains are being placed in position it is merely necessary to first insert the studs which are located together into the keyhole slots of the pair of female fasteners and then insert the other stud into the keyhole slot of the other female fastener which is located at a distance from the pair of female fasteners. This is followed out in both the upper and lower ends of the curtains to firmly hold the curtains in position. When it is desired to move the curtain it is merely necessary to grasp the handles 30 and 31 and give the curtain a sharp pull which will flex the metallic spring rod carried by the upper and lower ends thereof and pull the single studs 24 out of engagement with the socket portion of the fasteners carried by the vehicle body and top. This will permit of the convenient removal of the other portions of the curtains from the vehicle.

It can be seen that owing to the flexibility of the rods carried by the upper and lower ends of the curtains, that the same will conform to the configuration of the upper edge of the vehicle body and the curvature of the vehicle top. It is to be also noted that as the pocket 25 is secured to the curtain slightly above the lower edge of the curtain that the lower edge of the curtain will hang over the outer surface of the vehicle body thus providing a tight water proof closure between the curtain and body.

If it is so desired, however, the lower edge of the curtain may be folded back and stitched as at 35 to provide a pocket 36 at the extreme lower edge of the curtain and this pocket is adapted to receive the flexible spring rod 37 which is similar to the rods carried by the upper and lower edges of the curtains in the forms just described. This metallic rod also carries headed studs 38 which are adapted to engage in the sockets 26 carried by the upper edge of the body A of the vehicle. With this type of vehicle curtain, the curtains can be readily and easily placed in position from the inside of the machine in a minimum space of time. The meeting edges of the curtain are provided with any preferred type of snap fasteners 40 so as to prevent the passage of air between the curtain. If so desired the rearmost curtain designated by the numeral B may carry a predetermined number of snap fasteners 41, for engagement with the other portions of the snap fasteners carried by the vehicle top 11.

When the top of the vehicle is going to be left up for a considerable length of time or when it looks like rain, the curtains, B, C, D, and E are secured to the forward bow 12, the arms 16 and the pivoted links 20 at their upper edges in the ordinary manner and are connected to a central longitudinally extending brace, which is secured to the bows in any preferred manner. Thus if it starts to rain, it is merely necessary to disconnect the lower edges of the curtains from the longitudinally extending brace bar and secure the same at their lower edges to the upper edge of the vehicle body.

From the foregoing description, it can be seen that an exceptionally simple and improved vehicle curtain has been provided which can be readily and easily placed in position in a vehicle from the inside thereof and thus eliminating the inconveniences heretofore experienced in placing vehicle curtains in position.

Changes in details may be made without departing from the spirit or scope of this invention; but,

I claim:

1. In a vehicle closure, the combination with a vehicle body and a vehicle top, of a curtain including a flexible body, flexible resilient rods carried by the body adjacent to the upper and lower ends thereof, a pair of studs carried by each of the metallic resilient rods adjacent to one end thereof, a single stud carried by the rods adjacent to the opposite ends thereof, sockets carried by the vehicle top and body for receiving said studs, and handles carried by the rods and arranged adjacent to the single studs, whereby the single studs will be drawn outwardly of the sockets prior to the other studs.

2. In a vehicle closure, the combination with a vehicle body, and a vehicle top, of curtains including flexible bodies, flexible metallic resilient rods carried by the curtain bodies adjacent to the upper and lower edges thereof, a pair of studs carried by each of the metallic resilient rods adjacent to one end thereof, a single stud carried by the rods adjacent to the opposite ends thereof, pairs of sockets carried by the upper edge of the vehicle body and the inner surface of the vehicle top, spaced single sockets carried by the upper edge of the vehicle body and the vehicle top, the sockets having key hole slots arranged therein, the key hole slots in the single sockets and the pairs of sockets being arranged in opposite relation and adapted to receive the studs carried by the flexible metallic rods, and handles carried by the curtains and arranged adjacent to the single studs.

CHARLES A. ZAHN.